United States Patent [19]

Kolliker et al.

[11] 3,734,934
[45] May 22, 1973

[54] DISPERSIBLE α- AND β-SUBSTITUTED ANTHRAQUINONE DYESTUFFS CONTAINING AN -ALKYLENEOCOOR GROUP

[75] Inventors: Hans-Peter Kolliker, Munchenstein/Basel-Land; Alfred Staub, Binningen/Basel-Land; Peter Hindermann, Bottmingen/Basel-Land, all of Switzerland

[73] Assignee: Ciba-Geigy AG, Basel, Switzerland

[22] Filed: Apr. 1, 1970

[21] Appl. No.: 24,809

[52] U.S. Cl. .....................260/376, 8/39, 260/207, 260/261, 260/278, 260/303, 206/309.2, 206/379, 206/380, 206/463
[51] Int. Cl. .........C09b 1/20, C09b 1/22, D06p 3/54
[58] Field of Search....................260/376, 380, 205, 260/379

[56] References Cited

UNITED STATES PATENTS

| | | | |
|---|---|---|---|
| 2,319,043 | 5/1943 | Dickey et al. | 260/376 |
| 2,338,908 | 1/1944 | Dickey et al. | 260/376 |
| 3,097,909 | 7/1963 | Rhyner et al. | 260/376 X |
| 3,379,738 | 4/1968 | Wallace et al. | 260/376 |
| 3,442,914 | 5/1969 | Braun et al. | 260/376 |

FOREIGN PATENTS OR APPLICATIONS

44/24909   10/1969   Japan............................260/376

*Primary Examiner*—Floyd D. Higel
*Attorney*—Wenderoth, Lind & Ponack

[57] ABSTRACT

Dyestuffs of the formula

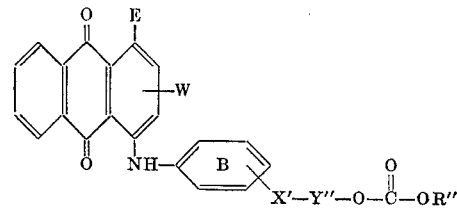

wherein W is chlorine, bromine, cyano, lower alkyl, lower alkoxy carbonyl, phenoxycarbonyl, lower alkythio, phenylthio, lower alkyl sulfonyl or a grouping of the formula

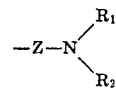

wherein Z is $-CO-$ or $-SO_2-$ and $R_1$ and $R_2$ are each independently hydrogen or lower alkyl,
Y' is lower alkylene, $-CH_2CH_2OCH_2CH_2-$ or $-CH_2CH_2CH_2-O-CH_2CH_2CH_2-$,
X is a direct bond, $-O-$, $-S-$, $-NH-$, $-COHN-$ or $-SO_2NH-$,
R'' is lower alkyl, cyclohexyl, phenyl or phenyl substituted by chlorine, lower alkyl or lower alkoxy, or bromine,
the nucleus B is either unsubstituted or is further mono-substituted by chlorine, lower alkyl or lower alkoxy,
E is $NH_2$, OH or NHT, and T is lower alkyl, cyclohexyl, phenyl, lower alkyl phenyl or phenoxyphenyl.

5 Claims, No Drawings

DISPERSIBLE α- AND β-SUBSTITUTED ANTHRAQUINONE DYESTUFFS CONTAINING AN -ALKYLENEOCOOR GROUP

DESCRIPTION OF THE INVENTION

The present invention relates to difficultly water-soluble anthraquinone dyestuffs, usable as dispersion dyestuffs, to processes for their production, to the use of these anthraquinone dyestuffs for the dyeing or printing of synthetic organic textile fibers, especially textile fibers made from linear polyesters of aromatic polycarboxylic acids with polyfunctional alcohols, or made from cellulose esters and, the textile fibers dyed or printed with said dyestuffs.

It has been found that, difficultly water-soluble anthraquinone dyestuffs being free from water-solubilizing groups dissociating acid in water and corresponding to the Formula I,

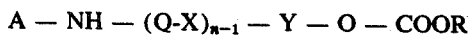

$$A - NH - (Q-X)_{n-1} - Y - O - COOR \qquad (I)$$

are characterized by particularly advantageous properties, e.g., good affinity on polyester fibers combined with good fastness to light and sublimation of the dyeings produced therewith.

In the above Formula I,

A. represents an α-anthraquinonyl radical containing in the β-positions hydrogen, halogen or a grouping which is bound to the anthraquinonyl radical by means of an aliphatic carbon atom, by means of a carbon atom containing bound di- and/or trivalent hetero atoms, or by means of a hetero atom, Q represents an unsubstituted or substituted arylene radical, X represents the direct bond, a hetero atom or a hetero grouping, n represents one of the numbers 1 or 2, Y represents an alkylene group, optionally substituted by a hydroxyl group or optionally interrupted by oxygen, R represents an optionally substituted aliphatic, cycloaliphatic or aromatic radical.

The anthraquinone dyestuffs of Formula I are obtained by reacting an anthraquinone compound of the Formula II,

$$A - NH - (Q-X)_{n-1} - Y - OH \qquad (II)$$

wherein A, Q, X, Y and n have the meaning given under Formula I, with a halogen formic acid ester of the Formula III,

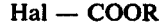

$$Hal - COOR \qquad (III)$$

wherein Hal represents chlorine or bromine and R has the meaning given under Formula I.

The starting materials are so chosen that the obtained anthraquinone dyestuff contains no water-solubilizing groups dissociating acid in water, that is to say that it contains for example no sulphonic acid, carboxylic acid or phosphoric acid groups.

The anthraquinone compounds of the Formula II, usable as starting materials, can belong to the series of the actual anthraquinonyl compounds as well as to that of the higher condensed derivatives, e.g., to the group of the anthrapyridinyl, anthrapyrimidinyl, pyrazolean-thronyl, isothiazoleanthronyl and thiopheneanthronyl compounds.

As halogen, the anthraquinonyl radical A can contain in the β-positions, e.g., fluorine, chlorine or bromine. As mono-valent groupings in the β-positions, bound to the anthraquinonyl radical by means of an aliphatic carbon atom, A can contain for example, lower alkyl groups, optionally substituted by phenyl, hydroxyl or by the grouping —O—COOR such as the methyl, benzyl, hydroxymethyl or the ROOC—O—CH₂-group. As monovalent groupings which are bound by means of a carbon atom containing bound di- and/or trivalent hetero atoms, are for example the cyano group, a carboxylic acid amide group, optionally mono- or di-substituted by lower alkyl groups, or carboxylic acid ester groups, e.g. a lower alkoxycarbonyl groups such as the carbomethoxy, carbethoxy, carboisopropoxy or carbobutoxy group, and as monovalent groupings which are bound by means of a hetero atom to the anthraquinonyl radical, are for example ether groups such as lower alkoxy or the phenoxy group, thioether groups such as lower alkylthio or phenylthio groups, lower alkylsulphonyl groups, sulphonic acid ester groups, such as lower alkoxy-sulphonyl groups, or sulphonic acid amide groups, optionally mono- or di-substituted by lower alkyl groups.

In addition to the aforesaid α-amino-substituent and the monovalent substituents in the β-positions, as defined, the anthraquinone nucleus can contain substituents in the further α-positions, e.g., hydroxyl groups, nitro groups, primary amino groups or secondary amino groups which are substituted, e.g., by a lower alkyl group such as the methyl, isopropyl or sec. butyl group, a cycloalkyl group such as the cyclohexyl group, an aryl group such as the phenyl, toluyl, 2,4,6-trimethylphenyl, phenoxyphenyl or phenylazophenyl group, as well as by a further ROOC—O—Y—(X-Q)$_{n-1}$—group.

A represents in particular the radical of an anthraquinone dyestuff which is linked with the aminosubstituent —NH—(Q-X)$_{n-1}$—Y—O—COOR in an α-position and selected from α-anthraquinonyl radicals of the formulas (a)
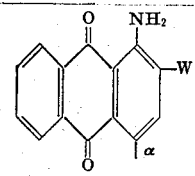

wherein

W represents halogen such as chlorine or bromine, or a grouping bound to the anthraquinone nucleus by means of an aliphatic carbon atom and selected from lower alkyl and lower alkyl substituted by phenyl or by the grouping —O—COOR whereby R has the meaning given under Formula I, or a grouping bound to the anthraquinone nucleus by means of a carbon atom comprising bound di- and/or trivalent heteroatoms and selected from cyano, lower alkoxy-carbonyl, phenoxy-carbonyl, carbamoyl, N-lower alkyl carbamoyl or N,N-di-lower alkyl carbamoyl, or a grouping bound to the anthraquinone nucleus by means of a hetero atom and selected from lower alkoxy, lower alkylthio, phenoxy, phenylthio, lower alkylsulphonyl, lower alkoxysulphonyl, sulfamoyl, N-lower alkyl sulfamoyl or N,N-dilower alkylsulfamoyl;

(b) 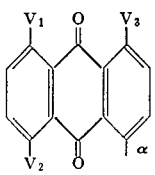

wherein
one of $V_1$, $V_2$ and $V_3$ represents the grouping NH—(-Q—X)$_{n-1}$—Y—O—COOR wherein Q,X,Y,R and $n$ have the meaning given above and the other two V's each represents hydrogen or hydroxy;

(c) 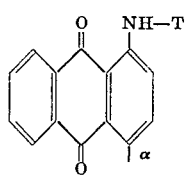

wherein
T represents lower alkyl, cycloalkyl, phenyl, lower alkylphenyl such as toluyl or 2,4,6-trimethylphenyl, or phenylazophenyl or phenoxyphenyl, and (d) 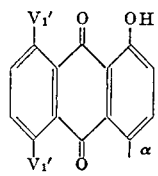

wherein one of $V_1'$ and $V_2'$ is hydrogen, or hydroxy and the other is hydrogen, hydroxy or — if the first V is hydroxy also nitro.

As arylene radical, Q represents, in particular, a phenylene radical which is optionally substituted by halogen, such as chlorine or bromine, lower alkyl or lower alkoxy groups, or it may also represent a phenoxyphenylene or phenylene-azo-phenylene group.

If X represents a hetero atom, then this is sulphur or preferably oxygen. If X represents a hetero grouping, then this is, e.g., an

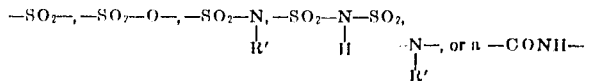

groups (whereby R' denotes hydrogen or a lower alkyl radical).

The alkylene group Y contains preferably at most four carbon atoms and when it is interrupted by oxygen at most six carbon atoms. The alkylene group Y can be straight-chained or branched; in the former case it is preferably the 1,2-ethylene, 1,3-propylene or 1,4-butylene group, in the latter case the 2-methyl-1,3-propylene or 2,2-dimethyl-1,3-propylene group. If the alkylene group Y is substituted by a hydroxyl group, it represents especially a 2-hydroxy-1,3-propylene group. If the alkylene group Y is interrupted by oxygen, it denotes in particular a diethylene- or dipropylene-oxy group.

If R represents an aliphatic radical, then it can be, e.g., a straight-chained or branched, optionally substituted lower alkyl or alkenyl group (in the latter case especially a $\triangle$ 2-alkenyl group) having preferably up to five carbon atoms. As substituents, these aliphatic radicals and especially the alkyl group can contain, e.g., halogens such as fluorine, chlorine or bromine, or a lower alkoxy group as well as a carbocylic ring of, in particular, aromatic character such as the phenyl radical, optionally substituted by chlorine or methyl groups, or heterocyclic rings such as the thienyl-(2)-, furyl-(2)- or tetrahydrofuryl-(2)-radical.

Cycloaliphatic radicals denoted by R are, e.g., cycloalkyl groups with preferably 5- or 6-membered rings, and especially the cyclohexyl or methylcyclohexyl group.

When R represents an aromatic radical, then this radical preferably belongs to the benzene series; it can contain usual non-ionogenic ring substituents. Such substituents are, e.g., halogens such as fluorine, chlorine or bromine, lower alkyl or lower alkoxy groups, preferably chlorine or methyl groups.

R represents, in particular, a lower alkyl group, unsubstituted or substituted by chlorine or bromine, a lower alkenyl group, cyclohexyl or a phenyl group which may be substituted by one or two substituents selected from chlorine and lower alkyl.

Starting materials of the Formula II are for the most part known or they can be produced by methods known per se, e.g., by reaction of an α-halogen anthraquinone of the Formula IV, $$A — (Hal)$$

(IV)

wherein A has the meaning given under Formula I and Hal denotes chlorine or bromine, with an amine of the Formula V, $$H_2N — (Q-X)_{n-1}—Y—OH$$

(V)

wherein Q, X, Y and n have the meaning given under Formula I.

Suitable α-halogen anthraquinones of the Formula IV are e.g., 1-amino-2,4-dibromoanthraquinone, 1-methylamino-4-bromoanthraquinone, 1-isopropylamino-4-bromoanthraquinone, 1-cyclohexylamino-4-bromoanthraquinone, 1-phenylamino-4-bromoanthraquinone, 1-(2',4',6'-trimethylphenylamino)-4-bromoanthraquinone, and suitable amines of the Formula V are, e.g. ethanolamine, 1,3-propanolamine, 1-amino-2-, 3- or 4-β-hydroxyethoxybenzene, or 1-amino-4-β,γ-dihydroxypropoxybenzene, 1-amino-2-, -3- or -4-β-hydroxyethylaminobenzene, 1-aminobenzene-2-, -3- or -4-carboxylic acid-β-hydroxyethylamide, 1-amino-benzene-2-, -3- or -4-sulphonic acid-β-hydroxyethylamide.

The halogen-formic acid ester of the Formula III, usable as starting materials, are likewise for the most part known.

Such esters are: halogen-formic acid-alkyl, -alkenyl, -aralkyl, -cycloalkyl or -aryl esters, e.g. chloroformic acid-methyl ester, chloroformic acid-ethyl ester, chloroformic acid-isopropyl ester, chloroformic acid-amyl ester, chloroformic acid-allyl ester, chloroformic acid-cyclohexyl ester, chloroformic acid-benzyl ester, chloroformic acid-p-methylbenzyl ester, chloroformic acid-p-chlorobenzyl ester, chloroformic acid-γ-chloropropyl ester, chloroformic acid-phenyl ester, chloroformic acid-2,4-dimethylphenyl ester or chloroformic acid-4-chlorophenyl ester, as well as the corresponding bromine derivatives.

The reaction of the anthraquinone compounds of the Formula II with the halogen-formic acid esters is advantageously performed at low temperatures (0°–50°C) in the presence of acid-binding agents and, optionally, in inert organic solvents.

Suitable as acid-binding agents are, in particular, tertiary nitrogen bases such as pyridine, picoline, quinoline, lepidine, aliphatic amines such as trimethylamine and triethylamine, anilines such as N,N-dimethylaniline and N,N-diethylaniline, also alkali metal or alkali earth metal carbonates, hydrogen-carbonates or hydroxides such as sodium hydrogen-carbonate, potassium carbonate, barium carbonate, sodium hydroxide or barium hydroxide. Suitable inert organic solvents are optionally halogenated or nitrated aromatic hydrocarbons such as toluene, xylenes, chlorobenzene, dichlorobenzene or nitrobenzene, as well as aliphatic halogenated hydrocarbons such as chloroform, carbon tetrachloride or tetrachloroethane, also lower aliphatic ketones such as acetone and cyclic ethers such as dioxan or tetrahydrofuran.

Preferred anthraquinone dyestuffs of the Formula I, which are characterized by a very good affinity, by very good levelling and build-up properties as well as by a good fastness to sublimation and light, correspond to the Formula VI,

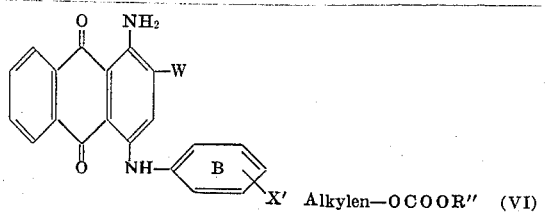

wherein
W represents halogen such as chlorine or bromine, the cyano group, a lower alkyl group, a carboxylic acid amide or sulphonic acid amide group, optionally substituted by lower alkyl groups, a lower alkoxy-carbonyl group or a lower alkylsulphonyl group, X' represents the direct bond, oxygen, the —NH—, —CONH— or —SO₂NH—group, "alkylene" represents a lower alkylene group and R" represents a lower alkyl group or a phenyl radical, optionally monosubstituted by halogen such as chlorine, or lower alkyl groups such as methyl, and wherein the benzene ring B is optionally further monosubstituted by halogen such as chlorine, lower alkyl or lower alkoxy groups.

Further anthraquinone dyestuffs, according to the invention, which likewise are characterized by a good affinity and levelling property, as well as by good fastness to light and sublimation of the polyester dyeings produced therewith are those of the Formula VII,

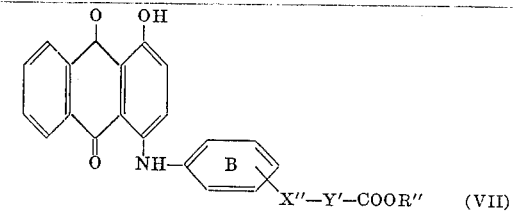

wherein
X" represents the direct bond, oxygen or the —SO₂NH—group,

Y' represents a lower alkylene group, or the groupings —CH₂CH₂O—CH₂CH₂ or —CH₂CH₂CH₂—O—CH₂CH₂CH₂— and R" and the ring B have the meanings given under Formula VI.

In this specification, including the claims, the term "lower" applied to "alkyl", "alkylene" and "alkoxy" groups or moieties means that such groups or moieties have at most five carbon atoms.

Anthraquinone dyestuffs of Formula I wherein $n$ is 2, may also be produced by condensing an anthraquinone compound of Formula VIII, $$A — V \qquad (VIII)$$

wherein A has the meaning given under Formula I and

V represents halogen, such as chlorine, bromine or fluorine, a hydroxyl, nitro or methoxy group, with an amine of the Formula IX, $$H_2N — Q — X — Y — O — COOR \qquad (IX)$$

wherein Q, X, Y and R have the meanings given under Formula I, whereby the starting materials are so chosen that the final dyestuff contains no groups dissociating acid in water.

Starting materials of the Formula VIII, applicable according to the invention, are for the most part known. Examples of these are: 1-amino-4-bromo-anthraquinone, 1-amino-4-chloro-anthraquinone, 1-amino-4-hydroxy-anthraquinone, 1-amino-4-nitro-anthraquinone, 1-amino-4-methoxy-anthraquinone, 1-amino-2-carbomethoxy-4-bromoanthraquinone or 1,4-dihydroxy-anthraquinone.

Amines of the Formula IX to be reacted with the latter compounds of the Formula VIII can be produced in a known manner e.g., by reacting a nitro compound of the Formula X, $$NO_2 — Q — X — Y — OH \qquad (X)$$

wherein Q, X and Y have the meaning given under Formula I, with a halogeno formic acid ester of the Formula III given above, whereby the condensation is performed as described in the foregoing, and then reducing the nitro group to the amino group.

Starting materials of the Formula VIII, wherein V represents the hydroxyl group, are advantageously reacted in the presence of boric acid or alkali metal salts thereof, with the amines of the Formula IX. If these amines are further substituted in both o-positions, then it is advisable to also use, together with boric acid, a 1,3-alkane-diol, which forms a cyclic ester with the boric acid, or a 1,3-alkane-diol boric acid ester.

If, as starting material, an anthraquinone compound of the Formula VIII is used, wherein V represents halogen, especially chlorine or bromine, it is advantageous to operate in the presence of copper or of a copper compound, such as copper-(I)-chloride, and with an acid-neutralizing agent, preferably at increased temperature. Suitable as an acid-neutralizing agent is, in particular, an excess of the amine of the Formula IX, optionally together with an alkali metal salt of a fatty acid having at most five carbon atoms or of carbonic acid, such as sodium or potassium acetate and sodium bicarbonate or sodium carbonate respectively, or together with an alkali metal hydroxide such as sodium or potassium hydroxide, or also magnesium oxide.

The reaction of the starting material of the Formula VIII, wherein V represents a methoxy or a nitro group, with the amines of the Formula IX is performed, for example, with an excess of amine in the melt at about 100°–250°C, preferably however in an organic solvent boiling at 100°–220°C. Suitable solvents are, e.g., optionally halogenated or nitrated, aromatic hydrocarbons such as xylols and mono-chlorobenzene or dichlorobenzene and nitrobenzene respectively, also alcohols such as alkanols having at least four carbon atoms, e.g. butanol or amyl alcohol, or alkylene glycols and monoalkyl ethers thereof. The preferred solvent is nitrobenzene.

The new anthraquinone dyestuffs of the Formula I are yellow to deeply colored, crystalline, difficultly water-soluble substances. By recrystallization from organic solvents, they can be obtained analytically pure, but such a purification is generally not required for their use in dyeing.

They are suitable for the dyeing or printing of synthetic organic fibers, e.g., for the dyeing of textile fibers made from linear high-molecular esters of aromatic polycarboxylic acids with polyfunctional alcohols, such as polyethylene glycol terephthalate or poly-(1,4-cyclohexanedimethylol-terephthalate), as well as for the dyeing of textile fibers made from cellulose-2-, 2 ½-acetate or cellulose triacetate. These dyestuffs can also be used, however, for the dyeing of synthetic polyamide fibers such as polyhexamethylene adipic amide, polycaprolactam or polyaminoundecanoic acid, and also for the dyeing of polyolefins, especially polypropylene fibers, as well as for the dyeing of polyamide in the mass.

Furthermore, they are suitable, depending on the composition, for the dyeing or pigmenting of lacquers, oils and waxes, as well as cellulose derivatives, particularly cellulose esters, such as cellulose acetate, in the mass.

The dyeing of the stated fiber materials with the difficultly water-soluble anthraquinone dyestuffs, according to the invention, is preferably performed from aqueous suspension. It is therefore advantageous to finely divide the final materials of the Formula I, usable as dispersion dyestuffs, by grinding them with dispersing agents and possible with further grinding auxiliaries.

Anionic dispersing agents, which are suitable for purpose are, e.g., the alkylaryl sulphonates, the condensation products of formaldehyde with naphthalene sulphonic acid, the lignin sulphonates; suitable non-ionogenic dispersing agents, are, e.g., the fatty alcohol or alkylphenyl-polyglycol ethers with a higher alkyl radical.

The dyeing of the polyester fibers with the difficultly water-soluble dyestuffs, according to the invention, from aqueous dispersion is carried out by the usual processes for polyester materials. Polyesters of aromatic polycarboxylic acids with polyvalent alcohols are preferably dyed at temperatures of above 100°C under pressure. But the dyeing can also be performed at the boiling point of the dye bath in the presence of dye carriers, e.g., phenylphenols, polychlorobenzene compounds or similar auxiliaries, or using the Thermosol process, i.e., pad-dyeing with subsequent treatment in the heat, e.g., thermofixing at 180°–210°C. Cellulose-2 ½-acetate fibers are preferably dyed at temperatures of 80°–85°C, whereas cellulose triacetate fibers, as well as synthetic polyamide fibers, are advantageously dyed at the boiling point of the bath. The use of dye carriers is not necessary in the dyeing of cellulose-2 ½-acetate fibers or polyamide fibers. Anthraquinone dyestuffs, according to the invention, can also be used for the printing of the stated materials using normal methods.

The anthraquinone dyestuffs of the Formula I, usable as dispersion dyestuffs, draw on to the previously mentioned hydrophobic organic fiber material, especially on to polyethylene glycol terephthalate fibers, very well and they produce thereon strong yellow, orange, red, violet, blue and green dyeings which have very good fastness to light, washing, rubbing, perspiration, sublimation, solvents and decatising.

Furthermore, anthraquinone dyestuffs, according to the invention, can very well be used in admixtures with other dispersion dyestuffs, which are fast to sublimation, for the dyeing of textile material using the pad-dyeing/thermofixing process. Particularly worthy of note is the fact that dyestuffs of the Formula I, produce, in the dyeing of closely woven polyester fabrics or firmly twisted polyester yarns, even dyeings right through. The new dyestuffs of the Formula I also possess the valuable property of being able to produce on textured polyester fibers, e.g., "Crimplene," very deep non-streaky dyeings which, moreover, have good fastness properties, particularly fastness to light and sublimation. The anthraquinone dyestuffs of Formula I also have good stability in the dye liquor and to boiling.

The following examples illustrate the invention. The temperatures are given in degrees centigrade.

EXAMPLE 1

45.3 g of 1-amino-2-bromo-4-(4'-β-hydroxyethoxy)-anilino-anthraquinone are stirred in 200 g of pyridine at 25°–30° and the deep blue solution is subsequently cooled to 0°–5°. While the solution is being well stirred, 27 g of chloroformic acid butyl ester are added dropwise at this temperature in the course of 30 minutes and the reaction mixture is maintained for a further 2 hours at 0°–10°. By the addition of 200 g of methanol, the dyestuff of the formula

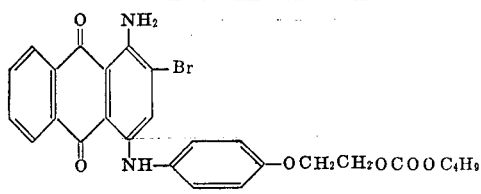

precipitates out in the form of beautiful dark violet - blue crystals; the dyestuff is filtered off, washed with methanol and dried.

From aqueous suspension, the finely divided dyestuff dyes polyethylene glycol terephthalate fibers in even, clear blue shades having good fastness to light, rubbing and sublimation.

The same dyestuff is obtained if the 27 g of chloroformic acid butyl ester are replaced by 36 g of bromoformic acid butyl ester with otherwise the same procedure.

If, in place of the 45.3 g of 1-amino-2-bromo-4-(4'-β-hydroxyethoxy)-phenylamino-anthraquinone, equivalent amounts of an anthraquinone compound given in the following Table 1, Column II, are used, and in place of the 27 g of chloroformic acid butyl ester, equivalent amounts of a halogen-formic acid ester listed in Column III of the same table, applying otherwise the same procedure as described in the example, then dyestuffs are obtained which dye polyethylene glycol terephthalate fibers in the shades given in Column IV of this table, these shades likewise having fastness to light and to sublimation.

TABLE I

| No. | Anthraquinone compound | Halogen-formic acid ester | Shade on polyethylene glycol terephthalate fibres |
|---|---|---|---|
| 2 | 1-amino-2-bromo-4-(4'-β-hydroxyethoxy-phenylamino)-anthraquinone | $Cl-COOCH_2CH_2CH_3$ | Blue. |
| 3 | Same as above | $Cl-COOCH(CH_3)_2$ | Do. |
| 4 | do | $Cl-COOC_2H_5$ | Do. |
| 5 | do | $Cl-COOCH_3$ | Do. |
| 6 | 1-amino-2-bromo-4-(4'-β-hydroxyethyl-phenylamino)-anthraquinone | $Cl-COOC_5H_{11}$ | Do. |
| 7 | 1-amino-2-methyl-4-[4'-(β-hydroxyethylcarbamoyl)-phenylamino]-anthraquinone | $Cl-COOCH_3$ | Do. |
| 8 | 1-amino-2-(N,N-dimethylcarbamoyl)-4-(3'-γ-hydroxypropoxy-phenylamino)-anthraquinone | $Cl-COOCH_2Cl$ | Do. |
| 9 | 1-amino-2-cyano-4-[4'-methyl-3'-(β-hydroxy-γ-hydroxypropyl-sulfonamido)-phenylamino]-anthraquinone | $Cl-COO-C_6H_5$ | Do. |
| 10 | 1-amino-2-(ethoxycarbonyl)-4-(4'-methyl-3'-hydroxymethyl-phenylamino)-anthraquinone | $Cl-COO-C_6H_4-H$ | Do. |

TABLE 1 —Continued

| No. | Anthraquinone compound | Halogen-formic acid ester | Shade on polyethylene glycol terephthalate fibres |
|---|---|---|---|
| 11 | 1-NH₂, 2-Cl, 4-NH-C₆H₄-NHCH₂CH₂OH anthraquinone | Cl—COOCH₂CBr₃ | Do. |
| 12 | 1-NH₂, 2-CH₂OH, 4-NH-C₆H₄-CH₂OH anthraquinone | Cl—COOC₂H₅ | Do. |
| 13 | 1-NH₂, 2-CONH₂, 4-NH-C₆H₄-OCH₂CH₂OH anthraquinone | Cl—COOC₂H₄Br | Do. |
| 14 | 1-NH₂, 2-SO₂CH₂CH₃, 4-NH-C₆H₄-OCH₂CH₂OH anthraquinone | Cl—COOC₂H₅ | Do. |
| 15 | 1-NH₂, 2-SO₂NHC₂H₅, 4-NH-C₆H₄-NHCH₂CH₂OH anthraquinone | ClCOOCH₃ | Do. |
| 16 | 1-NH-C₆H₄-O-CH₂CH₂OH anthraquinone | Cl—COO-C₆H₄-CH₃ | Red. |
| 17 | 1-NH₂, 2-SO₂O-C₆H₅, 4-NH-CH₂CH₂OH anthraquinone | Cl—COOC₃H₇ | Blue. |
| 18 | 1-NH₂, 2-COOC₂H₅, 4-NH-C₆H₄-O-C₆H₄-OCH₂CH₂OH anthraquinone | ClCOOCH₃ | Do. |

TABLE I — Continued

| No. | Anthraquinone compound | Halogen-formic acid ester | Shade on polyethylene glycol terephthalate fibres |
|---|---|---|---|
| 19 | 1-NH₂, 2-CH₃, 4-NH-C₆H₄-SO₂CH₂CH₂OH anthraquinone | ClCOO—C₆H₅ | Do. |
| 20 | 1-NH₂, 2-CONHCH₃, 4-NH-C₆H₄-OCH₂CH₂OH anthraquinone | ClCOOC₃H₇ | Do. |
| 21 | 1-NH₂, 2-COOC₂H₅, 4-NH-C₆H₄-OCH₂CH₂OH anthraquinone | ClCOOCH₂CH₂CH₂CH₃ | Do. |
| 22 | Same as above | Cl—COO—C₆H₅ | Do. |
| 23 | do | Cl—COOC₂H₅ | Do. |
| 24 | do | Cl—COOCH₃ | Do. |
| 25 | do | Cl—COO—C₆H₄—CH₃ | Do. |
| 26 | 1-NH₂, 2-COOC₂H₅, 4-NH-C₆H₄-OCH₂CH₂OH anthraquinone | Cl—COOC₂H₅ | Do. |
| 27 | 1-NH₂, 2-COOC₂H₅, 4-NH-C₆H₃(CH₃)-SO₂NHCH₂CH₂OH anthraquinone | Cl—COOC₂H₅ | Do. |
| 28 | 1-NH₂, 2-COOCH(CH₃)CH₂OCH₃, 4-NH-C₆H₄-N=N-C₆H₄-OCH₂CH₂OH anthraquinone | Cl—COOC₂H₅ | Green. |
| 29 | 1-NH₂, 2-COOC₂H₅, 4-NH-C₆H₃(CH₃)(CH₃)-SO₂NHCH₂CH₂OH anthraquinone | Cl—COOC₂H₅ | Blue. |

EXAMPLE 30

32.6 g of 1.4-bis-β-hydroxyethylamino-anthraquinone are partially dissolved in 150 g of pyridine and to this mixture are added dropwise, while it is being vigorously stirred, 62.6 g of chloroformic acid phenyl ester in the course of 20 minutes at 0°–10°. Stirring is maintained for a further 1 hour at room temperature and the formed dyestuff of the formula

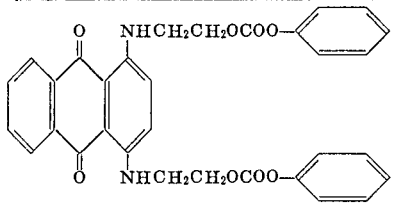

is then precipitated in fine-crystalline form by the addition in portions of 30 g of water; the dyestuff is filtered off, washed with ethanol and dried.

From the aqueous dispersion of the finely divided dyestuff, polyethylene glycol terephthalate fabric is dyed in very clear and even, deep blue shades.

By using, in place of the 32.6 g of 1.4-bis-β-hydroxyethylamino-anthraquinone, equivalent amounts of an anthraquinone compound given in the following Table 2, Column II, and in place of the 62.6 g of chloroformic acid phenyl ester, equivalent amounts of a halogen-formic acid ester listed in Column III of the same table, with otherwise the same procedure as described in the example, dyestuffs are obtained which dye polyethylene glycol terephthalate fibers in the shades given in Column IV of this table.

TABLE 2

| No. | Anthraquinone compound | Halogen-formic acid ester | Shade on polyethylene glycol terephthalate fibres |
|---|---|---|---|
| 31 | 1,4-bis(β-hydroxyethylamino)anthraquinone | ClCOO—C₆H₄—CH₃ | Blue. |
| 32 | 1,4-bis(β-hydroxyethylamino)anthraquinone | ClCOO—C₆H₅ | Do. |
| 33 | 1-(β-hydroxyethylamino)-4-(γ-hydroxypropylamino)anthraquinone | ClCOOCH₂—C₆H₅ | Do. |
| 34 | 1,5-bis(β-hydroxyethylamino)anthraquinone | ClCOO—C₆H₄—Cl | Red. |
| 35 | 1,5-bis(β-hydroxyethylamino)anthraquinone | ClCOO—C₆H₅ | Red. |
| 36 | 1-hydroxy-4,5-bis(β-hydroxyethylamino)anthraquinone | ClCOOC₄H₉(n) | Blue. |
| 37 | 2-chloro-1,4-bis(β-hydroxyethylamino)anthraquinone | ClCOO—C₆H₃(CH₃)₂ | Do. |

TABLE 2 — Continued

| No. | Anthraquinone compound | Halogen-formic acid ester | Shade on polyethylene glycol terephthalate fibres |
|---|---|---|---|
| 38 | 1,5-dichloro-4,8-bis(2,3-dihydroxypropylamino)anthraquinone (structure with Cl, Cl and NHCH$_2$CHCH$_2$OH / OH groups) | ClCOOCH$_2$–C$_6$H$_5$ | Do. |
| 39 | 1-(2-hydroxyethylamino)anthraquinone | ClCOO–C$_6$H$_4$–CH$_3$ | Red. |
| 40 | 1,4-bis[(4-(2-hydroxyethoxy)phenyl)amino]anthraquinone | Cl–COOC$_2$H$_5$ | Blue-green. |
| 41 | 1,4-bis[(4-(2-hydroxyethoxy)phenyl)amino]anthraquinone | ClCOO–C$_6$H$_5$ | Do. |
| 42 | 1,4-bis[(4-(2-(2-hydroxyethoxy)ethoxy)phenyl)amino]anthraquinone | Cl–COOC$_2$H$_5$ | Do. |

EXAMPLE 43

35.8 g of 5,8-dihydroxy-1,4-bis-β-hydroxyethylamino-anthraquinone are stirred up in a mixture of 300 g of chlorobenzene and 50 g of triethylamine for half an hour at 40°–50°. The suspension is then cooled to 5°–10° and, at this temperature with vigorous stirring, 43.4 g of chloroformic acid ethyl ester are added dropwise in 45 minutes. The reaction is completed by subsequent stirring for 4 hours at the same temperature and the formed dyestuff of the formula

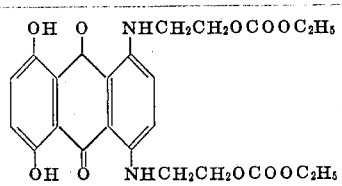

is precipitated out in fine-crystalline form by the addition of 300 g of ethanol. The dyestuff is filtered off, washed with ethanol and dried.

Cellulose triacetate fibers and polyethylene glycol terephthalate fibers are evenly dyed in the aqueous dispersion of the finely divided dyestuff in clear green-blue shades.

By using 62 g chloroformic acid phenylester instead of 43.4 g of chloroformic acid ethylester, otherwise performing the reaction under the same conditions, a further dyestuff is obtained which gives on polyethyleneglycol terephthalate fibers a green-blue shade.

By replacing, in the above example, the 35.8 g of 5,8-di-hydroxy-1,4-bis-β-hydroxyethylamino-anthraquinone by 41.8 g of 5,8-dihydroxy-1,4-bis-β,γ-dihydroxypropylamino-anthraquinone, or by 44.6 g of 5,8-dihydroxy-1,4-bis-β-(β'-hydroxyethoxy)-ethyl-amino-anthraquinone, otherwise performing the reaction under the same conditions, very similar green-blue dyestuffs are obtained.

EXAMPLE 44

To a suspension of 46.5 g of 1-hydroxy-2-benzyl-4-(3'-β-hydroxyethoxy)-phenylamino-anthraquinone and 7 g of potassium carbonate in 350 g of chlorobenzene are added dropwise in the course of half an hour at 0°–10°, while the suspension is being vigorously stirred, 27 g of chloroformic acid ethyl ester and the reaction mixture is then maintained for a further 2 hours at this temperature. With the addition to the mixture of 150 parts of methanol, the dyestuff of the formula

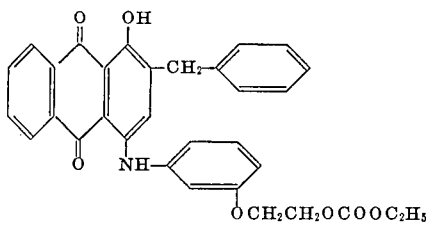

precipitates out in fine-crystalline form. It is filtered off, washed with methanol and water and dried.

In aqueous dispersion, the finely divided dyestuff draws on to polyethylene glycol terephthalate fibers with a clear violet-blue shade having good fastness to sublimation.

By using, instead of the 46.5 g of 1-hydroxy-2-benzyl-4-(3'-β-hydroxyethoxy)-phenylamino-anthraquinone, equivalent amounts of an anthraquinone compound given in the following Table 3, Column II, and instead of the 27 g of chloroformic acid ethyl ester, equivalent amounts of a halogen-formic acid ester listed in Column III of the same table, with otherwise the same procedure as described in the example, dyestuffs are obtained which dye polyethylene glycol terephthalate fibers in the shades given in Column IV of this table, these shades likewise having fastness to sublimation.

TABLE 3

| No. | Anthraquinone compound | Halogen-formic acid ester | Shade on polyethylene glycol terephthalate fibres |
| --- | --- | --- | --- |
| 45 | 1-hydroxy-2-benzyl-4-(3'-β-hydroxyethoxy)-phenylamino-anthraquinone | ClCOOC₂H₅ | Violet-blue. |
| 46 | 1-hydroxy-2-benzyl-4-(2'-β-hydroxyethoxy)-phenylamino-anthraquinone | ClCOOC₂H₅ | Do. |
| 47 | 1-hydroxy-4-(3'-β-hydroxyethoxy)-phenylamino-anthraquinone | ClCOOCH₂—CH=CH₂ | Do. |
| 48 | 1-hydroxy-4-(4'-β-hydroxyethyl)-phenylamino-anthraquinone | ClCOOCCl₃ | Violet. |
| 49 | 1-hydroxy-4-[4'-(2,3-dihydroxypropylamino)-phenylamino]-anthraquinone | ClCOOC₈H₁₇ | Violet-blue. |

TABLE 3.—Continued

| No. | Anthraquinone compound | Halogen-formic acid ester | Shade on polyethylene glycol terephthalate fibres |
|---|---|---|---|
| 50 | 1-hydroxy-4-[(4-(2-hydroxyethylamino)phenyl)amino]anthraquinone (O, OH; NH–C6H4–NHCH2–CH2OH) | ClCOOC8H17 | Do. |
| 51 | 1-hydroxy-4-[(4-methyl-...-SO2NHCH2CH2OH-phenyl)amino]anthraquinone (NH–C6H3(CH3)(SO2NHCH2CH2OH)) | BrCOOC2H5 | Violet. |
| 52 | 1-hydroxy-4-[(4-(2-hydroxyethoxy)phenyl)amino]anthraquinone (NH–C6H4–OCH2CH2OH) | ClCOOCH3 | Violet-blue. |
| 53 | 1-hydroxy-4-[(4-(2-hydroxyethoxy)phenyl)amino]anthraquinone | ClCOO–C6H5 | Do. |
| 54 | 1-hydroxy-4-[(4-(2-hydroxyethoxy)phenyl)amino]anthraquinone | ClCOOC2H5 | Do. |
| 55 | 1-hydroxy-2-benzyl-4-[(4-(2-hydroxyethoxy)phenyl)amino]anthraquinone | ClCOOC2H5 | Do. |
| 56 | 1-hydroxy-2-benzyl-4-[(4-(2-hydroxyethoxy)phenyl)amino]anthraquinone | ClCOOCH3 | Do. |
| 57 | 1-hydroxy-2-benzyl-4-[(4-(2-hydroxyethoxy)phenyl)amino]anthraquinone | ClCOOC4H9 | Do. |

TABLE 3.—Continued

| No. | Anthraquinone compound | Halogen-formic acid ester | Shade on polyethylene glycol terephthalate fibres |
|---|---|---|---|
| 58 | 1-OH, 2-CH$_2$-C$_6$H$_5$, 4-NH-C$_6$H$_4$-OCH$_2$CH$_2$OH anthraquinone | ClCOO-C$_6$H$_5$ | Do. |
| 59 | 1-OH, 2-CH$_2$-C$_6$H$_5$, 4-NH-C$_6$H$_4$-OCH$_2$CH$_2$OH anthraquinone | ClCOO-C$_6$H$_4$-CH$_3$ | Do. |
| 60 | 1-OH, 4-NH-C$_6$H$_4$-(OCH$_2$CH$_2$)$_2$OH anthraquinone | ClCOOC$_2$H$_5$ | Do. |
| 61 | 1-NO$_2$, 4,5-(OH)$_2$, 8-NH-C$_6$H$_4$-CH$_2$CH$_2$OH anthraquinone | ClCOOC$_2$H$_5$ | Blue. |
| 62 | 1-OH, 4-NH-C$_6$H$_4$-N(CH$_3$)-CH$_2$-CH$_2$OH anthraquinone | ClCOOC$_2$H$_5$ | Violet-blue. |
| 63 | 1-NO$_2$, 4,5-(OH)$_2$, 8-NH-C$_6$H$_4$-O-CH$_2$-CH$_2$OH anthraquinone | ClCOOC$_2$H$_5$ | Blue. |
| 64 | 1,5-(OH)$_2$, 4-OH, 8-NH-C$_6$H$_4$-OCH$_2$CH$_2$OH anthraquinone | ClCOOC$_2$H$_5$ | Do. |
| 65 | 1-OH, 4-NH-C$_6$H$_3$(OCH$_3$)-OCH$_2$CH$_2$OH anthraquinone | ClCOO-C$_6$H$_5$ | Reddish-blue. |

TABLE 3.—Continued

| No. | Anthraquinone compound | Halogen-formic acid ester | Shade on polyethylene glycol terephthalate fibres |
|---|---|---|---|
| 66 | [1-OH, 4-NH-(3-Cl, -OCH₂CH₂OH)-phenyl anthraquinone] | ClCOOC₂H₅ | Violet-blue. |
| 67 | [1-OH, 4-NH-C₆H₄-O-C₆H₄-OCH₂CH₂OH anthraquinone] | ClCOOC₂H₅ | Do. |
| 68 | [1-OH, 4-NH-C₆H₄-S-CH₂CH₂OH anthraquinone] | ClCOOCH₃ | Reddish-blue. |
| 69 | [1-OH, 4-NH-C₆H₄-SO₂CH₂CH₂OH anthraquinone] | ClCOOC₄H₉ | Violet. |
| 70 | [1-OH, 4-NH-C₆H₄-(OCH₂CH₂CH₂)₂OH anthraquinone] | ClCOOCH₃ | Violet-blue. |
| 71 | [1-OH, 4-NH-(4-Cl, -SO₂OCH₂CH₂OH)-phenyl anthraquinone] | ClCOOC₂H₅ | Viole |
| 72 | [1-OH, 4-NH-C₆H₄-O-C₆H₄-OCH₂CH₂OH anthraquinone] | ClCOOCH(CH₃)CH₃ | Violet-blue. |

EXAMPLE 73

28 g of chloroformic acid methyl ester are added dropwise at 10°–15°, while vigorous stirring is maintained, to 33.8 g of 1-isopropylamino-4-γ-hydroxypropylamino-anthraquinone in 180 g of N,N-dimethylaniline and the reaction mixture is stirred at this temperature until the starting material is no longer detectable in the thin-layer chromatogram. By the addition of 180 g of methanol, the reaction product of the formula

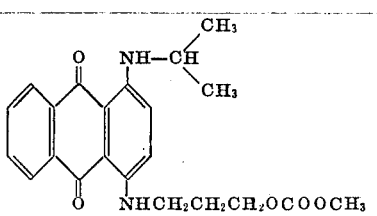

is precipitated from the solution. It is filtered off, washed with cold methanol and dried.

In aqueous dispersion of the finely divided dyestuff, pure blue shades can be produced on synthetic fibers such as cellulose-2 ½-, triacetate, polyamide and polyethylene glycol terephthalate fibers.

By using, in place of 33.8 g of 1-isopropylamino-4-γ-hydroxypropylamino-anthraquinone, equivalent amounts of an anthraquinone compound given in the following Table 4, Column II and, in place of the 28 g of chloroformic acid methyl ester, equivalent amounts of a halogen-formic acid ester of Column III, with otherwise the same procedure as described in the example, dyestuffs are obtained which dye polyethylene glycol terephthalate fibers in the shades listed in Column IV of this table.

TABLE 4

| No. | Anthraquinone compound | Halogen-formic acid ester | Shade on polyethylene glycolterephthalate fibres |
|---|---|---|---|
| 74 | 1-NH-CH(CH$_3$)$_2$-anthraquinone-4-NHCH$_2$CH$_2$OH | ClCOOCH$_3$ | Blue. |
| 75 | Same as above | ClCOOC$_2$H$_5$ | Do. |
| 76 | 1-NH-CH(CH$_3$)(CH$_2$CH$_3$)-anthraquinone-4-NHCH$_2$CH$_2$CH$_2$CH$_2$OH | ClCOOCH$_3$ | Do. |
| 77 | 1-NH-CH$_3$-anthraquinone-4-NHCH$_2$CH$_2$CH$_2$OH | ClCOOCH$_3$ | Do. |
| 78 | 1-NH-C$_6$H$_5$-anthraquinone-4-NHCH$_2$CH(OH)CH$_3$ | ClCOOCH$_2$-C$_6$H$_5$ | Do. |
| 79 | 1-NH$_2$-2-CONH$_2$-anthraquinone-4-NHCH$_2$CH$_2$OH | ClCOOCH(CH$_3$)$_2$ | Do. |
| 80 | 1-NH$_2$-2-SCH$_2$CH$_3$-anthraquinone-4-NHCH$_2$CH$_2$CH$_2$OH | ClCOO-C$_6$H$_5$ | Do. |
| 81 | 1-NH$_2$-2-COO-C$_6$H$_5$-anthraquinone-4-NHCH$_2$CH(OH)CH$_2$OH | ClCOOC$_2$H$_5$ | Do. |

EXAMPLE 82

35.8 g of 1-phenylamino-4-β-hydroxyethylaminoanthraquinone are completely dissolved, by heating, in 400 g of pyridine and, after rapid cooling of the solution to 0°–10°, 24.5 g of chloroformic acid propyl ester are added dropwise, while the solution is being well stirred, within 20 minutes. The reaction is then completed by a brief heating to 20°–25°, whereupon the formed dyestuff of the formula

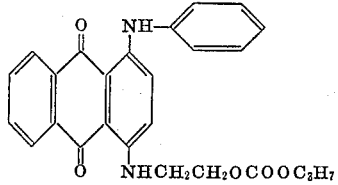

precipitates, with the addition of 80 g of water, in a fine form. The dyestuff is filtered off and dried.

From aqueous dispersion, the finely divided dyestuff draws on to polyethylene glycol terephthalate fibers to give a deep blue shade. The dyeings have good fastness to light, rubbing and sublimation.

By using, instead of the 35.8 g of 1-phenylamino-4-β-hydroxyethylamino-anthraquinone, equivalent amounts of an anthraquinone compound given in the following Table 5, Column II and, instead of the 24.5 g of chloroformic acid propyl ester, equivalent amounts of a halogen-formic acid ester listed in Column III of the same table, with otherwise the same procedure as stated in the example, dyestuffs are obtained which dye polyethylene glycol terephthalate fibers in the shades given in Column IV of this table, these shades too having fastness to light and sublimation.

TABLE 5

| Number | Anthraquinone compound | Halogen-formic acid ester | Shade on polyethylene glycolterephthalate fibres |
| --- | --- | --- | --- |
| 83 | | ClCOOCH₂CH₂CH₃ | Blue. |
| 84 | | ClCOOCH₃ | Do. |
| 85 | | ClCOOC₂H₄Cl | Green. |
| 86 | | ClCOOCH₃ | Blue. |
| 87 | | ClCOOCH₂CH(CH₃)CH₃ | Do. |
| 88 | | ClCOOC₂H₅ / ClCOOC₄H₉ | Blue-green. |

TABLE 5 —Continued

| Number | Anthraquinone compound | Halogen-formic acid ester | Shade on polyethylene glycolterephthalate fibres |
|---|---|---|---|
| 89 | [1,4-bis(4-(2-hydroxyethoxyethoxy)phenylamino)anthraquinone structure with NH—C₆H₄—OCH₂CH₂OCH₂CH₂OH groups at 1 and 4 positions] | ClCOOCH₃ | Do. |
| 90 | [1,4-bis(4-(2,3-dihydroxypropoxy)phenylamino)anthraquinone structure with NH—C₆H₄—OCH₂CH(OH)—CH₂OH and NH—C₆H₄—OCH₂CH(OH)—CH₂OH groups] | ClCOOC₂H₅ | Do. |

EXAMPLE 91

32 g of N-methyl-4-β-hydroxyethylamino-anthrapyridone are dissolved in 250 ml of pyridine and to this solution are added dropwise at 0°–10°, while it is being vigorously stirred, 31.3 g of chloroformic acid phenyl ester in the course of half an hour. The reaction is completed after a further 3 hours at this temperature. The dyestuff of the formula

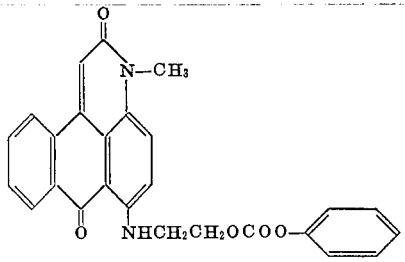

precipitates, after the addition of 250 ml of methanol, almost quantitatively from the deep red solution; the dyestuff is filtered off, washed with methanol and dried.

Polyethylene glycol terephthalate fibers are dyed in the aqueous dispersion of the finely divided dyestuff very uniformly in clear red shades having good fastness to sublimation and rubbing.

By using, instead of the 32 g of N-methyl-4-β-hydroxyethylamino-anthrapyridone, equivalent amounts of an anthraquinone compound given in the following Table 6, Column II and, instead of the 31.3 g of chloroformic acid phenyl ester, equivalent amounts of a halogen-formic acid ester listed in Column III of the same table, with otherwise the same procedure as described in the example, dyestuffs are obtained which dye polyethylene glycol terephthalate fibers in the shades given in Column IV of this table, these shades too having fastness to sublimation.

TABLE 6

| No. | Anthraquinone compound | Halogen-formic acid ester | Shade on polyethylene glycol terephthalate fibres |
|---|---|---|---|
| 92 | [anthraquinone with pyridazine ring fused, NH—C₆H₄—CH₂CH₂OH] | ClCOOC₅H₁₁ | Yellow. |
| 93 | [anthraquinone with N=S ring, CH₃, NHCH₂CH₂CH₂OH] | ClCOOCH₂—CH=CH₂ | Orange-yellow. |
| 94 | [anthraquinone with N—N—CH₃ ring, NHCH₂CH₂OH] | ClCOOCH₂—C₆H₅ | Red. |

TABLE 6 — Continued

| No. | Anthraquinone compound | Halogen-formic acid ester | Shade on polyethylene glycol terephthalate fibres |
|---|---|---|---|
| 95 | 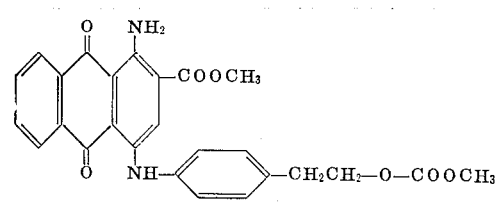 | ClCOOCH₂Cl | Red. |
| 96 | 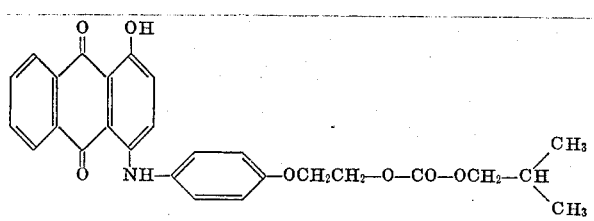 | ClCOOC₂H₅ | Red. |
| 97 | Same as above | ClCOO—⌬ | Red. |

EXAMPLE 98

A mixture of 18 g of 1,4-dihydroxyanthraquinone and 6 g of leuco-1,4-dihydroxyanthraquinone is stirred, after the addition of 38 g of 4-isobutoxycarbonyloxyethoxyaniline and 12.5 g of boric acid in 100 ml of methyl alcohol, for 4 hours at 60° – 65°. After this period of time, the dark-violet-colored reaction mixture is diluted with a further 100 ml of methyl alcohol and, at room temperature, the dyestuff of the formula which has precipitated in the form of very dark violet crystals, is filtered off, washed with methyl alcohol and warm water and afterwards dried at 50° – 60° under reduced pressure.

From aqueous dispersion, the finely divided dyestuff dyes polyethylene glycol terephthalate fibers in reddish blue shades having very good fastness to sublimation and good fastness to light.

EXAMPLE 99

36 g of 1-amino-4-bromoanthraquinone-2-carboxylic acid methyl ester are homogeneously stirred together with 58.5 g of 4-methoxycarbonyloxyethyl aniline, 22 g of potassium acetate and 0.5 g of cuprous chloride for 18 hours in 200 ml of n-butyl alcohol at 110°–115°. During this period of time, the reaction mixture turns blue. The dyestuff of the formula is precipitated, in crystalline form, by the addition of 150 ml of ethyl alcohol, filtered off at room temperature, washed with ethyl alcohol and water and dried at 100°.

From aqueous dispersion, the finely divided dyestuff dyes polyethylene glycol terephthalate fibers in intensive blue shades having good fastness to sublimation.

EXAMPLE 100

2 g of the dyestuff obtained according to example 1 are dispersed in 4,000 g of water. To this dispersion are added, as swelling agent, 12 g of the sodium salt of o-phenylphenol as well as 12 g of diammonium phosphate and 100 g of yarn made from polyethylene glycol terephthalate are dyed for 1 ½ hours at 95°–98°. The dyeing is rinsed and subsequently treated with aqueous sodium hydroxide solution and a dispersing agent.

In this manner is obtained a deeply colored, dark violet-blue dyeing having fastness to light and sublimation.

If, in the above example, the 100 g of polyethylene glycol terephthalate yarn are replaced by 100 g of cellulose triacetate fabric, dyed under the stated conditions and afterwards rinsed with water, a clear blue dyeing is obtained having very good fastness to washing and to sublimation.

EXAMPLE 101

In a pressure-dyeing apparatus, 2 g of the dyestuff, obtained according to example 2, are finely suspended in 2,000 g of water containing 4 g of oleylpolyglycol ether. The pH-value of the dye bath is adjusted to 4–5 with acetic acid.

100 g of fabric made from polyethylene glycol terephthalate are then introduced at 50°, the bath is heated within 30 minutes to 140° and dyeing performed for 50 minutes at this temperature. The dyeing is subsequently rinsed with water, soaped and dried. Under these conditions is obtained a deeply colored blue dyeing having fastness to perspiration, light and sublimation.

The dyestuffs described in the other examples produce, with application of this process, dyeings of equal quality.

EXAMPLE 102

Polyethylene glycol terephthalate fabric is impregnated on a padding machine at 40° with a dye liquor of the following composition:

20 g of the dyestuff, obtained according to example 88, finely dispersed in
7.5 g of sodium alginate
20 g of triethanolamine
20 g of octylphenolpolyglycol ether and
900 g of water.

The fabric, squeezed out to ca. 100 percent, is dried at 100° and afterwards fixed during 30 seconds at a temperature of 210°. The dyed material is rinsed with water, soaped and dried. Under these conditions is obtained a deeply colored green-blue dyeing having fastness to rubbing, light and sublimation.

The dyestuffs described in the other examples produce, with application of this process, dyeings of equal quality.

We claim:

1. A dyestuff corresponding to the formula

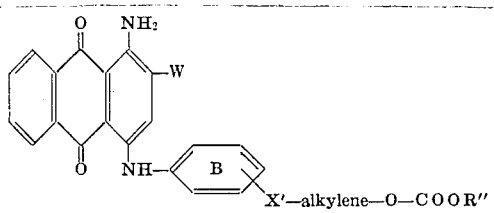

wherein
W represents chlorine, bromine, cyano, lower alkyl, phenyl lower alkyl, lower alkoxycarbonyl, lower alkylsulfonyl or

wherein
Z represents —CO— or —SO$_2$— and R$_1$ and R$_2$ each independently of the other represent hydrogen or lower alkyl, X' represents the direct bond, oxygen, —NH—, —CONH— or —SO$_2$NH—, alkylene represents lower alkylene and R" represents lower alkyl, lower alkyl monosubstituted by fluorine, chlorine or bromine, phenyl or phenyl monosubstituted by chlorine or methyl and wherein the ring B is not further substituted or is further monosubstituted by chlorine, lower alkyl or lower alkoxy.

2. A dyestuff according to claim 1 of the formula

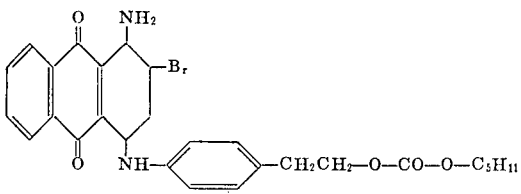

3. A dyestuff according to claim 1 of the formula

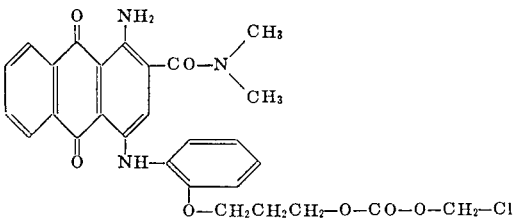

4. A dyestuff according to claim 1 of the formula

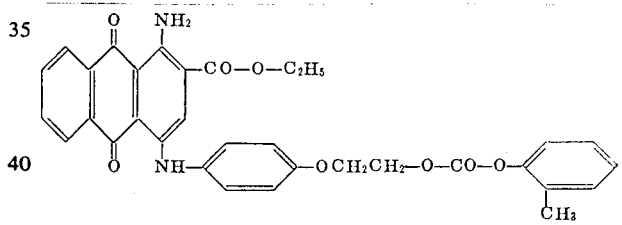

5. A dyestuff according to claim 1 of the formula

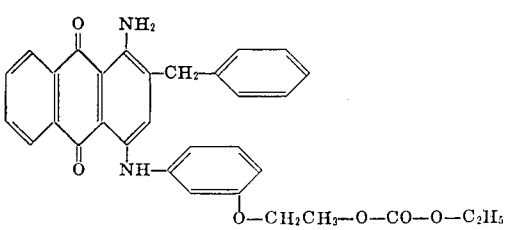

* * * * *

UNITED STATES PATENT OFFICE
CERTIFICATE OF CORRECTION

Patent No. 3,734,934     Dated May 22, 1973

Inventor(s) HANS-PETER KOLLIKER ET AL.

It is certified that error appears in the above-identified patent and that said Letters Patent are hereby corrected as shown below:

On the Title Page:

After "[21] Appl. No.: 24,809" insert

--[30] Foreign Application Priority Data

April 2, 1969   Switzerland   5025/69--

Signed and sealed this 25th day of December 1973.

(SEAL)
Attest:

EDWARD M. FLETCHER, JR.
Attesting Officer

RENE D. TEGTMEYER
Acting Commissioner of Patents